(12) United States Patent
Kuhn

(10) Patent No.: US 8,322,519 B2
(45) Date of Patent: Dec. 4, 2012

(54) BELT CONVEYOR

(75) Inventor: Michael Kuhn, Sinsheim (DE)

(73) Assignee: Interroll Holding AG (CH)

( * ) Notice: Subject to any disclaimer, the term of this patent is extended or adjusted under 35 U.S.C. 154(b) by 25 days.

(21) Appl. No.: 12/996,097

(22) PCT Filed: May 22, 2009

(86) PCT No.: PCT/EP2009/003641
§ 371 (c)(1),
(2), (4) Date: Feb. 9, 2011

(87) PCT Pub. No.: WO2009/141157
PCT Pub. Date: Nov. 26, 2009

(65) Prior Publication Data
US 2011/0120838 A1    May 26, 2011

(30) Foreign Application Priority Data

May 21, 2008    (DE) .......................... 10 2008 024 508

(51) Int. Cl.
*B65G 21/16*    (2006.01)
(52) U.S. Cl. ....................................................... 198/831
(58) Field of Classification Search ................. 198/831, 198/847
See application file for complete search history.

(56) References Cited

U.S. PATENT DOCUMENTS

| | | | |
|---|---|---|---|
| 2,446,890 A * | 8/1948 | Stadelman | 198/831 |
| 3,878,937 A | 4/1975 | Glaser et al. | |
| 3,978,976 A | 9/1976 | Kamp | |
| 4,179,026 A * | 12/1979 | de Vries | 198/831 |
| 4,185,737 A * | 1/1980 | Blattermann | 198/831 |
| 5,332,082 A * | 7/1994 | Sommerfield | 198/831 |
| 6,866,141 B2 | 3/2005 | Saeki | |
| 6,899,220 B2 | 5/2005 | Saeki | |
| 2003/0132088 A1 | 7/2003 | Watanabe et al. | |
| 2004/0144626 A1* | 7/2004 | Saeki | 198/831 |

FOREIGN PATENT DOCUMENTS

| | | |
|---|---|---|
| AT | 355 983 | 8/1979 |
| DE | 90 12 692.0 | 2/1992 |
| DE | 40 28 181 | 3/1992 |
| DE | 43 25 477 | 2/1995 |

(Continued)

OTHER PUBLICATIONS

European Office Action.

*Primary Examiner* — James R Bidwell
(74) *Attorney, Agent, or Firm* — Gerald E. Hespos; Michael J. Porco

(57) ABSTRACT

The invention relates to a belt conveyor which comprises a conveyor belt (20) that is guided around at least one return shaft (30), thereby forming an upper run and a lower run, and a drive device for moving the conveyor belt (20), characterized in that the drive device is preferably arranged in a separate manner from the return shaft (30) and drives the conveyor belt (20) in the area of a deflection between upper run and lower run. The drive device preferably comprises a toothed belt (40) or V-belt arranged at an edge section of the conveyor belt (20) and a rotationally drivable toothed wheel (60) or a V-belt disk. The toothed belt (40) or V-belt is connected or connectable, preferably in a releasable manner, to the conveyor belt (20).

18 Claims, 3 Drawing Sheets

FOREIGN PATENT DOCUMENTS

| | | |
|---|---|---|
| DE | 195 32 391 | 3/1997 |
| DE | 196 35 665 | 3/1998 |
| DE | 198 54 327 | 11/2000 |
| DE | 602 15 936 | 6/2007 |
| EP | 1 710 176 | 10/2006 |
| GB | 2 316 380 | 2/1998 |
| GB | 2375091 | 6/2002 |
| GB | 2 375 091 | 11/2002 |

\* cited by examiner

BELT CONVEYOR

BACKGROUND OF THE INVENTION

1. Field of the Invention

The present invention relates to a belt conveyor, a method for mounting the belt conveyor, and the use of a drive device for a belt conveyor.

2. Description of the Related Art

In a belt conveyor or rope belt conveyor, an elastic and/or bendable conveyor belt is usually driven in a continuous manner by the conveyor belt being guided around return shafts or return pulleys. Here, at least one return pulley is driven by a motor, so that a load-bearing upper run of the conveyor belt travels in one direction, whereas a lower run travels in the opposite direction on a lower side. The conveyor belt is subject to wear and needs to be replaced after a certain period of time or a certain number of working hours. The replacement of the conveyor belt is difficult and time-consuming, since particularly in the case of an endless belt a multitude of parts of the belt conveyor needs to be demounted and subsequently be mounted again.

Thus, it is the object of the invention to provide a belt conveyor in which a conveyor belt can be replaced in a simple and cost-saving manner within a short period of time.

SUMMARY OF THE INVENTION according to one aspect of the invention, the belt conveyor comprises a conveyor belt that is guided around at least one return shaft to form an upper run and a lower run, and a drive device for moving the conveyor belt, wherein the drive device is arranged and/or mounted or fixed separately from the return shaft and drives the conveyor belt (20) in the area of a deflection between the upper run and the lower run. In other words, the drive device is mounted to a frame or mounting frame in a preferably fully separate manner from the return shaft. A vertical upper portion of the conveyor belt is referred to as an upper run, on which the items or goods are transported and which moves in the conveying direction, whereas a portion of the conveyor belt travelling back below and opposite to the conveying direction is referred to as a lower run. Preferably, the drive device is arranged in the area of the at least one return shaft.

Demounting/Mounting of the drive device upon replacement of the conveyor belt is not necessary due to the drive device being arranged separately from the return shaft. It is absolutely sufficient to demount the return shaft to install a new conveyor belt. The drive device, however, may remain mounted in the frame of the belt conveyor during the replacement operation of the conveyor belt. Thus, the conveyor belt can be replaced in a simple manner and accordingly, only low mounting costs occur for the replacement of the conveyor belt. For example, the drive device comprises a gear or a V-belt pulley for engagement with a toothed belt or V-belt arranged on the conveyor belt, and preferably a motor for mechanically driving the gear or the V-belt pulley to drive the conveyor belt via the engagement with the toothed belt or V-belt.

An electric motor, such as an AC motor or a three-phase AC motor, is preferably used as the motor. However, any other motor, such as a DC motor, a hydraulic motor, a pneumatic motor, an internal combustion engine or the like, can be used as well depending on the application purpose.

Preferably, the drive device comprises a toothed belt or V-belt, which is arranged on an edge portion of the conveyor belt, and a rotatably drivable gear or a V-belt pulley, which is preferably coupled to an electric motor. Further preferably, an axis of the gear or the V-belt pulley is preferably located on an elongation of an axis of the return shaft.

Further preferably, the at least one return shaft can be demounted separately from the gear or the V-belt pulley. Preferably, two return shafts are arranged, one at an end of the belt conveyor each.

According to a preferred embodiment, the return shaft comprises a plurality of roll bodies, which are arranged next to each other and which can be rotated preferably independently from each other.

A speed difference of the conveyor belt in the width direction, in particular in the case of a curved belt, can be preferably compensated for by the return shaft comprising a plurality of roll bodies, which are arranged next to each other and which can be rotated preferably independently from each other. In other words, in the case of a curved belt, a radially outer portion has a higher cycle speed than a radially inner portion, and accordingly these portions need to be moved or guided around the return shaft at different speeds. These speed differences can be realized gently by the roll bodies, which are arranged next to each other, being rotatable independently from each other.

Alternatively, the return shaft may be formed integrally and conically to compensate for speed differences of the conveyor belt.

Preferably, the return shaft can be arranged and/or mounted by being hung in the frame of the belt conveyor. The return shaft can preferably be shifted and/or fixed in a longitudinal direction of the belt conveyor to tension the conveyor belt.

Demounting/Mounting of the return shaft upon replacement of the conveyor belt can be performed in a simple and fast manner due to the return shaft merely being hung in the frame of the belt conveyor. In addition, the conveyor belt can be tensioned by shifting the return shaft in a longitudinal direction of the conveyor belt. Thus, a separate tensioning device for tensioning the conveyor belt is not required. Therefore, the belt conveyor can be produced with a minimum of individual parts.

Preferably, the hung in return shaft can be tensioned by means of a biased pneumatic spring. The pneumatic spring is preferably configured such that it automatically locks in place or is adjusted when the conveyor belt is in a fully relaxed position, i.e. when the return shaft is displaced inwardly or opposite to the tensioning direction. Due to the adjustment of the pneumatic spring, the return shaft can be easily taken off from its bearing to exchange the conveyor belt. The adjustment can preferably be released manually in order to initiate the tensioning of the conveyor belt after mounting simply by releasing the adjustment of the pneumatic spring.

Preferably, the at least one return shaft is arrangeable or arranged on at least one end of a belt curve. In other words, the belt conveyor is formed as a curved belt conveyor, and the return shaft redirects the conveyor belt downward to establish a connection between the advancing upper run and the returning lower run of the conveyor belt.

According to a further aspect of the invention, the belt conveyor comprises a conveyor belt, which is guided around at least one return shaft, and a drive device for moving the conveyor belt, preferably according to one or more of the preceding aspects, wherein the conveyor belt comprises a toothed belt or V-belt engaged with the drive device and releasably connected or connectable to the conveyor belt.

A toothed belt, or V-belt, or a conveyor belt can be replaced separately due to the toothed belt or V-belt for driving the conveyor belt being releasably connected or connectable to the conveyor belt. Thus, costs for replacing worn components can re reduced, since depending on the state of wear the toothed belt or V-belt can be replaced without the conveyor belt or the conveyor belt can be replaced without the toothed belt or V-belt.

Preferably, the toothed belt or V-belt has a lateral extension connected or connectable to the conveyor belt.

Further preferably, the lateral extension has a plurality of tabs, which are separated from each other by recesses and which are connectable or connected to the conveyor belt preferably by rivets.

The tabs that are separated from each other by recesses offer the advantage of a preferred power transmission from the toothed belt or V-belt to the conveyor belt with, at the same time, a lateral or angular shiftability of the toothed belt or V-belt with respect to the conveyor belt, which is possible in predetermined limits. Thereby, construction errors or tolerances can be compensated for, so that a smooth operation of the belt conveyor is made possible even in the case of relative high tolerances. In addition, the production costs can be minimized due to relatively high tolerances in the production and maintenance of the belt conveyor. The output of the manufactured components can be increased though, since only a low scrap quantity is produced with these high tolerances.

Furthermore, the conveyor belt can position itself in the recesses or troughs at the return points between the tabs of the lateral extension in order to minimize longitudinal tensions in the deflection.

Finally, no high adjustment and orientation tolerances are to be stuck to when mounting the belt conveyor, whereby the mounting time and mounting costs can be minimized.

The toothed belt or V-belt can be released from the conveyor belt and connected to another conveyor belt in a simple manner due to the conveyor belt being connected to the toothed belt or V-belt by means of rivets. Alternatively or in addition, other fastening elements, such as screws, splints, press studs, etc., can be used as well.

Preferably, the toothed belt or V-belt comprises at least a first tension-bearing member layer preferably arranged in the interior thereof, which is arranged lengthwise to a movement direction of the toothed belt or V-belt.

The toothed belt or V-belt can transfer high driving forces due to the toothed belt or V-belt comprising a first tension-bearing member layer, preferably a pair of first tension-bearing member layers, which is arranged in a longitudinal direction or movement direction of the toothed belt or V-belt. In addition, a lengthening of the toothed belt or V-belt is largely avoided even in the case of high mileage. Thus, even after many working hours there are no disturbances caused by a changed spacing or a changed distance of teeth of the toothed belt or V-belt and/or the sagging of a lower run of the toothed belt or V-belt.

In particular in the case of a curved belt conveyor, blocking of a drive device due to lengthening, as might occur with the use of a chain instead of the toothed belt or V-belt, can be avoided.

Further preferably, the toothed belt or V-belt comprises at least a second tension-bearing member layer preferably arranged at an angle of 30° to 50° with respect to the movement direction of the toothed belt or V-belt.

Due to the toothed belt or V-belt comprising the second tension-bearing member layer, which is arranged at an angle of 30° to 50° with respect to the movement direction of the toothed belt or V-belt, large forces can be transferred to the conveyor belt b the toothed belt or V-belt without deforming the tabs excessively. In addition, the bending behavior of the toothed belt or V-belt during the deflection at the gear or the V-belt pulley can be optimized due to the angular arrangement of the second tension-bearing member layer. In other words, the relatively rigid second tension-bearing member layer does not or only slightly influence the bending behavior of the toothed belt or V-belt, since the second tension-bearing member layer is arranged at an angle to the movement direction of the toothed belt or V-belt. Furthermore, the angular position of the second tension-bearing member layer preferably corresponds to a line of force, which transfers the driving force from the toothed belt or V-belt to the conveyor belt. Here, the second tension-bearing member layer is arranged across the entire length of the toothed belt or V-belt angularly to an extension of the toothed belt or V-belt.

Preferably, the second tension-bearing member layer extends into the lateral extension and/or tabs.

Further preferably, at least one tensile-load bearing member of the first and/or second tension-bearing member layers has at least one layer of woven warp and weft threads. It is best for the first tension-bearing member layer to have a regular lay or Lang's lay rope, and the second tension-bearing member layer preferably has at least one layer of woven warp and weft threads.

The toothed belt or V-belt preferably contains polyurethane and is preferably welded and/or glued to the tabs and/or the extension, which also contain polyurethane. However, the toothed belt or V-belt may also be formed integrally with the lateral extension or the tabs in order to do without the step of welding/gluing in the production.

Preferably, the conveyor belt is an endless belt. Thus, it is possible to do without a mounting step of connecting belt ends, and loosening of a belt connection during operation can be avoided.

According to a further embodiment, such a belt conveyor may comprise a clamping surface provided on the conveyor belt or on the lateral extension, which is in contact with a frame-side clamping member that applies a clamping force directed transversely to the longitudinal direction of the conveyor belt to the clamping surface. The clamping force may be slighted toward the conveyor belt plane, so that the clamping element is pushed toward one or more abutments that may be arranged on the side of the conveyor belt opposite to the clamping member, and may e.g. be formed by idler roller. In a curved belt, a component of the clamping force may be directed radially outwardly, so that the clamping force lies within a radius plane in which the radius of the curve falls and which is perpendicular to the conveyor belt.

With such a belt conveyor, the clamping surface may be provided on the toothed belt or on a V-belt and/or on a clamping element formed in addition to the toothed belt. A clamping element formed in addition to the toothed belt or V-belt may be formed integrally with the toothed belt or V-belt or as a separate element having a multi-part design, which can be formed or fixed separately on the conveyor belt or the extension.

Moreover, with such a belt conveyor, the toothed belt or V-belt and/or the clamping element may be arranged on the inner side of the continuous conveyor belt. On the inner side of the continuous conveyor belt means on the side of the return shaft. As described, the parts may be arranged directly or indirectly on the conveyor belt, i.e. on the conveyor belt itself or on the lateral extension of the conveyor belt. Preferably, the arrangement, in particular of the clamping element, is only on the inner side of the continuous conveyor belt, thus on the pressure side of the belt with respect to the neutral fiber. Accordingly, no clamping element would be arranged on the outer side of the conveyor belt. The clamping element would thus not be tensioned when the conveyor belt passes the return shaft.

Since the conveyor belt is designed as an endless belt, it can be mounted by simply being placed on the return shaft. Joining of two ends of the conveyor belt can be omitted. Furthermore, such an endless belt runs smoothly, and a connecting point cannot get loosened.

According to a further aspect, a method for mounting a belt conveyer with the following steps is provided: mounting a drive device on a frame or a basis of a belt conveyor; introducing at least one return shaft into the belt loop, i.e. into the interior of an endless belt or in the interior of a conveyor belt, the ends of which being connected to each other; and hanging the at least one return shaft in the frame or the base of the belt conveyor to cause the mounting of the conveyor belt.

Since in this mounting method the mounting of the drive device is performed separately from the mounting of the conveyor belt, demounting of the drive device upon replacement of the conveyor belt is not necessary. Thus, the replacement of the conveyor belt can be performed in a fast and cost-efficient manner.

In addition, also the drive device can be mounted and demounted separately from the mounting of the conveyor belt, so that the conveyor belt and the return shaft can remain mounted when the drive device is being replaced. This also has the advantage of cost and time saving.

Furthermore, according to an aspect of the invention, a drive device having a rotatably drivable gear or a V-belt pulley for driving a belt conveyor designed as described above is used.

In the following, the invention will be described in more detail with reference to the accompanying drawings by way of an embodiment.

DETAILED DESCRIPTION OF THE PREFERRED EMBODIMENTS

Figure 1:
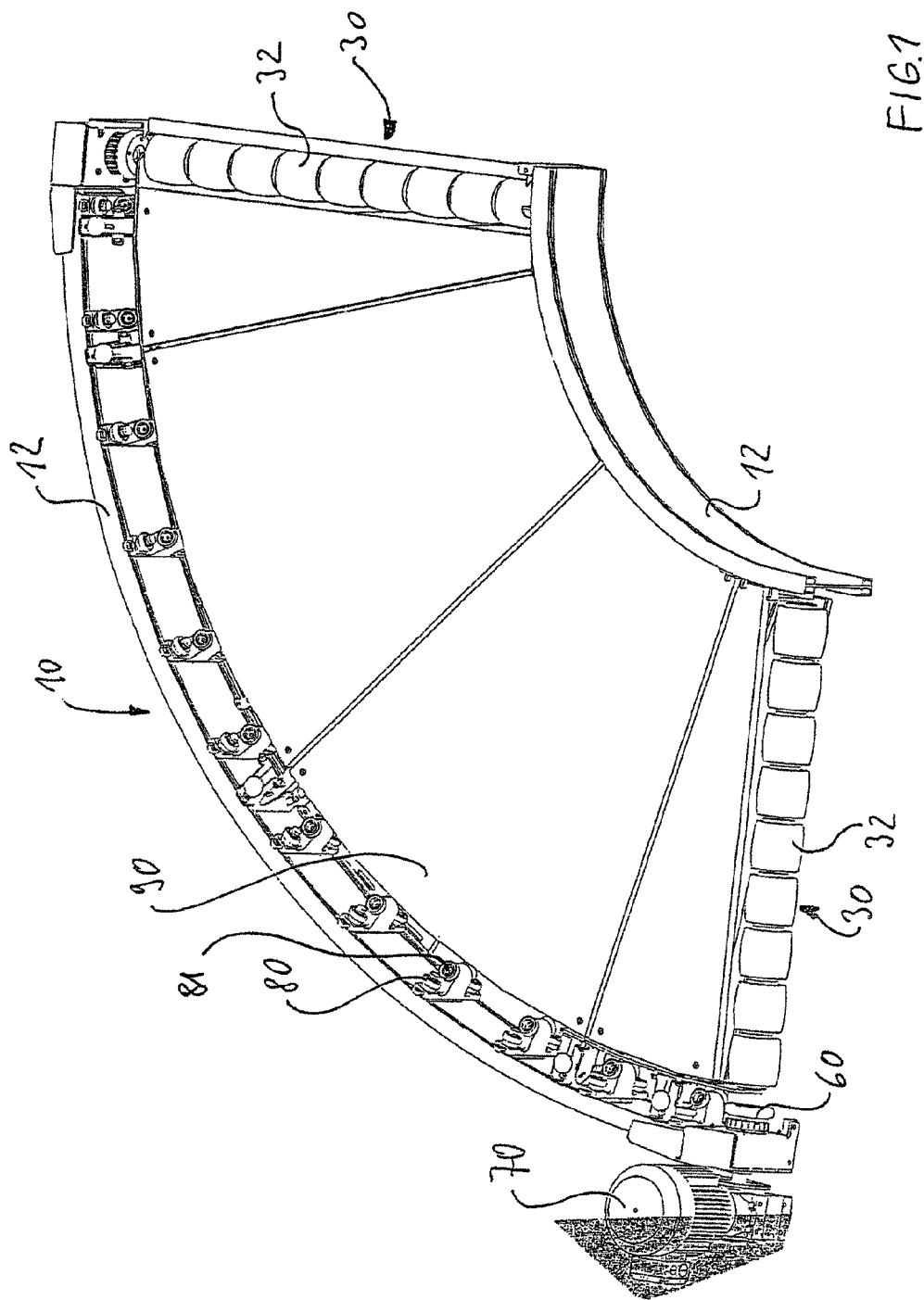
FIG. 1 shows a perspective view of the belt conveyor according to the invention in the form of a curved belt conveyor, with a conveyor belt being demounted.

The curved belt conveyor shown in FIG. 1 comprises a frame 10 that is formed by a pair of longitudinal beams or double-T beams 12. A return shaft 30 for returning a conveyor belt (not shown) is each arranged at the ends of the double-T beam 12.

The return shaft 30 is hung in the frame 10, wherein at least one of the two return shafts 30 is shiftable in a longitudinal direction or a movement direction of the not-shown conveyor belt in order to be able to clamp the conveyor belt after mounting thereof.

In addition, the return shaft 30 comprises a plurality of roll bodies 32 that can be rotated independently from each other. Since the conveyor belt has a lower cycle speed on an inner side, i.e. on a side with a smaller bending radius, than on an outer side or a side with a large bending radius, a roll body 32 arranged on the inner side needs to have a correspondingly lower cycle speed than a roll body 32 arranged on the outer side.

In addition, there is mounted to the frame 10 an electric motor 70 with a gear 60 for driving a toothed belt not shown in FIG. 1. Preferably, the gear 60 is arranged directly on an output shaft of the electric motor 70. The unit consisting of the electric motor 70 with the gear 60 can be mounted or demounted to the frame 10 independently from the return shaft 30. On the other hand, the return shaft 30 can be mounted or demounted independently from the drive unit consisting of the electric motor 70 and the gear 60.

The drive device with the gear 60 is preferably positioned or positionable such that an axis or rotational axis of the gear 60 lies substantially on an axis or rotational axis of the return shaft 30.

In addition, the belt conveyor comprises a plurality of idler rollers 80 for guiding the toothed belt (not shown). Preferably, the height of these idler rollers 80 is adapted to the thickness of the toothed belt. Alternatively, the idler rollers 80 may also be arranged in a vertically shiftable manner to facilitate mounting of the toothed belt and to be able to adjust their height according to the thickness of the toothed belt. Moreover, on the frame side there is arranged a plurality of clamping members formed as clamping rollers 81, which according to the illustrated embodiment are arranged on the other side of the conveyor belt, not shown in this figure, with respect to the idler rollers 80.

Figure 2:
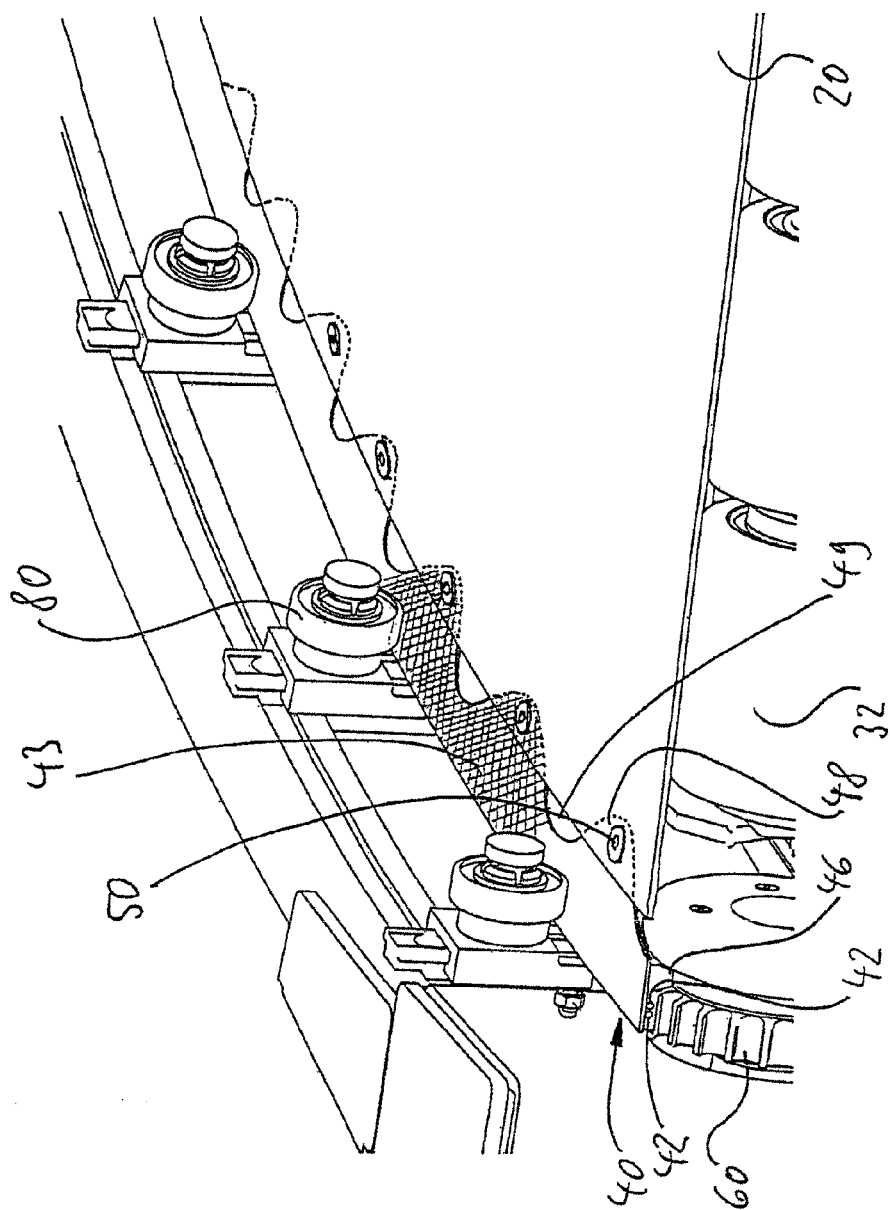
FIG. 2 shows a detailed view of the belt conveyor according to the invention of FIG. 1, with a conveyor belt being mounted.

FIG. 2 shows a detailed view of the belt conveyor of FIG. 1, a conveyor belt 20 and a toothed belt 40 being mounted in FIG. 2 though.

The toothed belt 40 is placed onto the gear 60 with the toothing 46 thereof in order to be engaged therewith. Thus, the toothed belt 40 is driven by driving the gear 60 due to the engagement of the teeth of the gear 60 with the toothing 46. Thereby, the toothed belt 40 moves along the double-T beam 12 of the frame 10. This movement of the toothed belt 40 is transferred to the conveyor belt 20 via the tabs 48 (extension) and rivets 50, so that the conveyor belt 20 is also moved along the pair of double-T beams 12.

The toothed belt 40 is provided with at least one first tension-bearing member 42, preferably with a pair of tension-bearing members 42, in order to be able to transfer high driving forces without extensively lengthening or extensively loading the toothed belt. When two or more tension-bearing members 42 are arranged, they are preferably arranged next to each other to bend around the gear 60 in a smooth manner. These first tension-bearing members 42 are preferably formed as a regular lay or Lang's lay rope, while the toothed belt 40 is preferably made of polyurethane.

Preferably, in the extension or tab 48 there is arranged a plurality of second tension-bearing members, which can form a second tension-bearing member layer 43 to transfer the driving force from the toothed belt 40 to the conveyor belt 20. These second tension-bearing members of the second tension-bearing member layer 43 preferably comprise at least one layer of woven warp and weft threads and are preferably arranged at an angle with respect to the movement direction of the toothed belt, preferably at an angle of 30 to 50 degrees, most preferably at an angle of 40 to 45 degrees.

Preferably, the direction of the angularly arranged second tension-bearing members 43 substantially corresponds to a line of force for inducing the movement force from the toothed belt 40 to the conveyor belt 20. Moreover, further second tension-bearing members can preferably be arranged perpendicularly to the second tension-bearing members in the force-inducing direction. In other words, there are second tension-bearing members 43 that are arranged at an angle of 30 to 50 degrees, i.e. at an angle substantially in correspondence with a force-inducing direction, and further second tension-bearing members 43 that are displaced by 90 degrees with respect to the first-mentioned second tension-bearing members. This has the advantage that when the movement direction of the belt conveyor is reversed, the further last-mentioned second tension-bearing members 43 now substantially correspond to the force-inducing direction from the toothed belt 40 to the conveyor belt 20.

In summary, one can say that second tension-bearing member layers 43 are arranged such that a plurality of second tension-bearing members 43 is each arranged in the force-inducing direction both in the one movement direction of the belt conveyor and in the opposite movement direction of the belt conveyor.

The tabs or extensions 48 of the toothed belt 40 are connected to the conveyor belt 20 preferably by rivets 50. In this way, a simple and cost-efficient connection between the toothed belt 40 and the conveyor belt 20 is provided. If the conveyor belt 20 or the toothed belt 40 is replaced, this connection can be released and reestablished in a simple manner. Alternatively, this connection may also be established by another connection method, such as screwing, splints, gluing, vulcanizing, etc.

The invention particularly relates to a belt conveyor having a conveyor belt 20, which is guided around at least one return shaft 30, and a drive device for moving the conveyor belt 20, wherein the drive device is preferably arranged separately from the return shaft 30. The drive device preferably comprises a toothed belt 40, which is arranged or arrangeable on an edge portion of the conveyor belt 20, and a rotatably drivable gear 60. The toothed belt 40 is preferably connected or connectable to the conveyor belt 20 in a releasable manner.

Objects can be conveyed at an arbitrary angle with the curved belt conveyor shown in the figures. Preferably, clamping means (not shown), such as a curved guide, can act on the radially inward flank of the toothed belt to guide the toothed belt around the curve.

However, the invention is not limited to the curved belt conveyor as shown, but can also be applied to a straight belt conveyor. In addition, the drive device with the gear 60 and the toothed belt 40 can also be arranged on the inner side or on both sides of the conveyor belt 20 in the case of a curved belt conveyor. Furthermore, instead of the electric motor 70, an other drive device, such as a hydraulic motor, a servo motor, an internal combustion engine, etc., can be used for driving the belt conveyor as well. The frame 10 does not need to exhibit the double-T beam 12, but any other kind of frame, such as a simple T-beam, an L-beam, a rod, or a tube, can be used for forming the frame as well. Optionally, the belt conveyor can be provided with guide plates 90, which are to be connected to the frame 30 in an easy to release manner as well. Although a toothed belt placed around a gear is used as a drive according to the embodiment, a V-belt with a corresponding V-belt pulley can be used as well.

Figure 3:
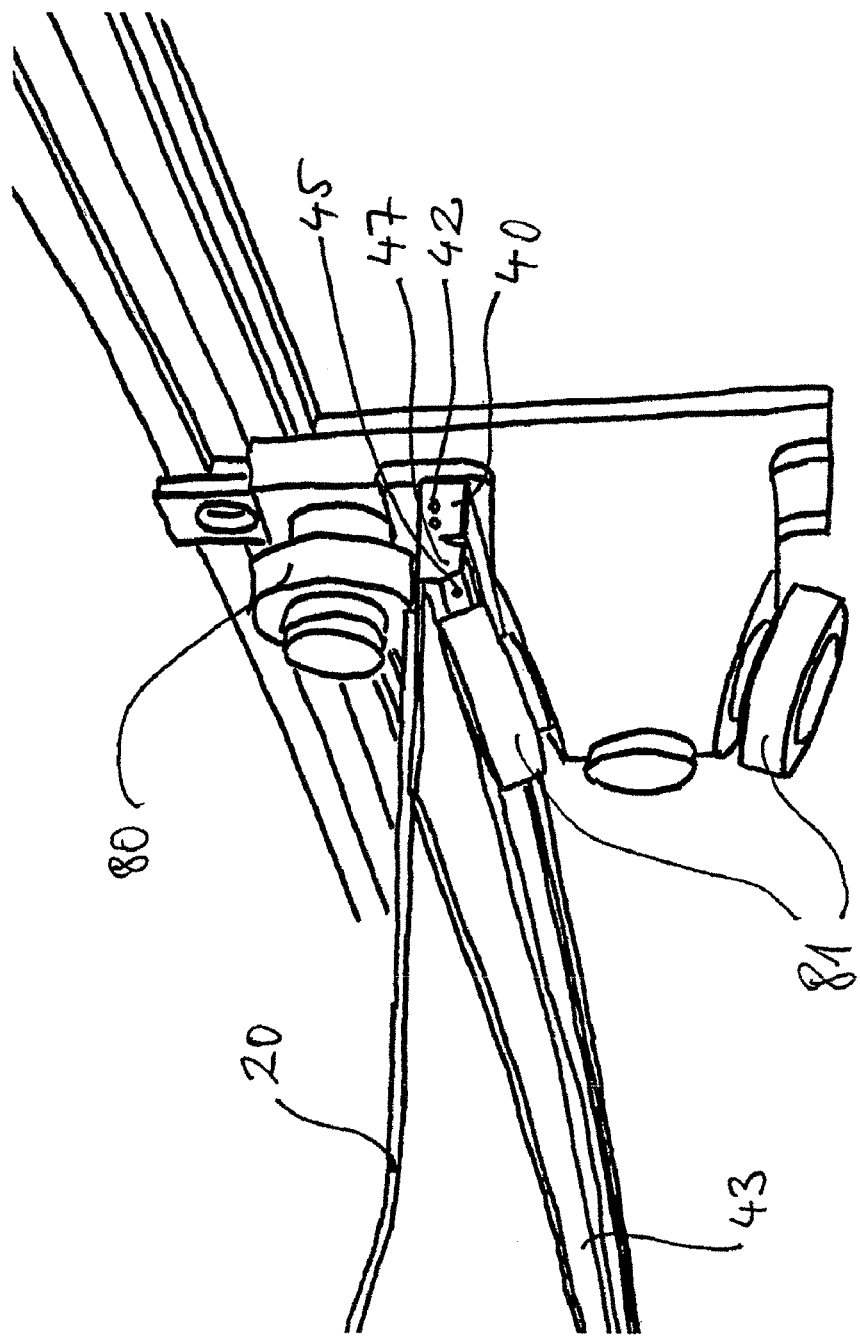
FIG. 3 shows a sectional view of the belt conveyor with a further embodiment of a placed conveyor belt with a toothed belt and a clamping element.

FIG. 3 shows a sectional view of the belt conveyor with a further embodiment of a placed conveyor belt 20 with a toothed belt 40 and a clamping element 47. In this embodiment, the clamping element 47 and the toothed belt 40 are arranged on the inner side of the continuous conveyor belt 20, i.e. on the side of the return shaft not shown in FIG. 3.

In this embodiment, the clamping element 47 is formed with the toothing 46 in addition to the toothed belt and separated therefrom by a gap, which extends between the toothing 46 and the clamping element 47 in the direction of the extension fixed to the conveyor belt 20. In this embodiment, the gap does not divide the toothed belt and the clamping element 47 completely, so that the two elements are formed integrally in the present case, so that only one integral component needs to be fixed on the extension of the conveyor belt 20. Furthermore, a first tension-bearing member 42 is shown in this embodiment as well.

It is also conceivable that the toothed belt or a V-belt provided instead of the toothed belt is provided in a fully separated manner from the clamping element 47, i.e. with a multi-part design. In this case, the toothing may be arranged on the outer side of the conveyor belt. Due to the toothing, tensile stress in the toothed belt 40 could also be kept low for an arrangement on the outer side. However, it is advantageous that at least the clamping element 47, which should have a certain uniform constructional height to be able to provide a sufficiently large clamping surface 45, is arranged on the inner side of the conveyor belt 20. In the case of an arrangement on the inner side, the clamping element 47 lies within the continuous neutral fibre of the conveyor belt, i.e. the fibre of the conveyor belt that—upon passing of the belt around the return shaft—is neither loaded with a tensile stress nor with a compressive stress. Preferably, neither a clamping element 47 nor a toothed belt 40 is provided on the outer side of the conveyor belt in order to be able to fully use the width of the belt for objects to be conveyed.

According to yet a further embodiment (not illustrated), the clamping surface 45 can also be formed as a flank of the toothed belt 40, so that a widthwise extension of the component part can be reduced.

As can be seen in FIG. 3, the clamping surface 45 of the illustrated embodiment is in contact with a frame-side clamping member. The frame-side clamping member is formed as a clamping roller 81, which is designed similar to or identical with the idler rollers 81 in this embodiment. The clamping rollers 81 are slightly inclined to apply a radially outward or obliquely upward clamping force to the clamping surface 45 of the clamping element 47. In this way, the clamping element 47 can tension the conveyor belt 20 radially outwardly. In addition, the backside of the toothed belt 40 or a second tension-bearing member layer 43 arranged between the toothed belt 40 and the idler roller 81 is pressed against the idler roller 80 and thus guided safely between the idler roller 80 and the clamping roller 81. The idler roller 80 is substantially perpendicular to the conveyor belt plane. Thus, clamping forces are almost exclusively applied via the clamping rollers 81, disregarding frictional forces on the idler rollers 80. The width of the conveyor belt can be used optimally due to the perpendicular posture of the idler rollers 80.

In FIG. 3, below the described clamping roller 81 there is provided an optional second clamping roller 81, which can serve to tension and guide the returning lower run in the same manner.

The invention claimed is:

1. A belt conveyor comprising: a conveyor belt (20) guided around at least one return shaft (30) to form an upper run and a lower run, and a drive device for moving the conveyor belt (20), the drive device being mounted separately from the return shaft (30) and driving the conveyor belt (20) in an area of a deflection between the upper run and the lower run, the drive device including a driven gear or a V-belt pulley engaged with a toothed belt or V-belt arranged on an edge portion of the conveyor belt and a rotational axis of the driven gear or the V-belt pulley being aligned with the rotational axis of the return shaft.

2. The belt conveyor according to claim 1, wherein the drive device is coupled to an electric motor (70).

3. The belt conveyor according to claim 2, wherein the return shaft (30) can be demounted separately from the gear (60) or the V-belt pulley.

4. The belt conveyor according to claim 1, wherein the return shaft (30) comprises a plurality of roll bodies (32), which are arranged next to each other and which can be rotated independently from each other, or is formed as a conical return shaft.

5. The belt conveyor according to claim 1, wherein the at least one return shaft (30) is arrangeable by being hung in a frame (10) of the belt conveyor and is shiftable and/or fixable in a longitudinal direction of the belt conveyor (20) to tension the conveyor belt (20).

6. The belt conveyor according to claim 1, wherein the at least one return shaft (30) is arrangeable or arranged on at least one end of a belt curve.

7. The belt conveyor according to claim 1, wherein the toothed belt (40) or V-belt is releasably connected or connectable to the conveyor belt (20).

8. The belt conveyor according to claim 7, wherein the toothed belt (40) or V-belt has a lateral extension connected or connectable to the conveyor belt (20).

9. The belt conveyor according to claim 8, wherein the lateral extension has a plurality of tabs (48), which are separated from each other by recesses (49) and which are connectable or connected to the conveyor belt (20) preferably by rivets (50).

10. The belt conveyor according to claim 9, wherein the toothed belt (40) or V-belt comprises at least a first tension-bearing member layer (42) arranged in the interior thereof, the first tension-bearing member layer (42) being the arranged lengthwise to a movement direction of the toothed belt (40).

11. The belt conveyor according to claim 10, wherein the toothed belt (40) or V-belt comprises at least a second tension-bearing member layer (43) arranged at an angle of 30° to 50° with respect to the movement direction of the toothed belt (40) or V-belt, wherein the second tension-bearing member layer (43) extends into the lateral extension and/or tabs (48).

12. The belt conveyor according to claim 11, wherein the first tension-bearing member layer (42) comprises a regular lay or Lang's lay rope and the second tension-bearing member layer (43) comprises at least one layer of woven warp and weft threads.

13. The belt conveyor according to claim 8, wherein the conveyor belt (20) is an endless belt.

14. The belt conveyor according to claim 8, wherein a clamping surface is provided on the conveyor belt (20) or on the lateral extension, which is in contact with a frame-side clamping member that applies a clamping force directed transversely to the longitudinal direction of the conveyor belt (20) to the clamping surface.

15. The belt conveyor according to claim 14, wherein the clamping surface is provided on the toothed belt (40) or V-belt or on a clamping element formed in addition to the toothed belt (40).

16. The belt conveyor according to claim 15, wherein the toothed belt (40), the V-belt or the clamping element is arranged on the inner side of the continuous conveyor belt.

17. A method for mounting a belt conveyer with the steps of:
mounting a drive device with a gear or V-belt pulley on a frame (10) of the belt conveyor;
engaging the gear or V-belt pulley with a toothed belt arranged on an edge portion of a conveyor belt;
introducing at least one return shaft (30) into the belt loop so that the return shaft (30) is mounted separately from the drive device and so that a rotational axis of the return shaft is aligned with a rotational axis of the gear or V-belt pulley; and
hanging the at least one return shaft (30) in the frame (10).

18. A belt conveyor comprising: a conveyor belt (20) guided around at least one return shaft (30) to form an upper run and a lower run, and a drive device for moving the conveyor belt (20), the drive device being mounted separately from the return shaft (30) and driving the conveyor belt (20) in an area of a deflection between the upper run and the lower run, a toothed belt (40) having a lateral extension with a plurality of tabs (48) separated from each other by recesses (49) and being connected releasably to the conveyor belt (20), the tabs (48) being engaged with the drive device, the toothed belt (40) having at least a first tension-bearing member layer (42) arranged in an interior thereof, the first tension-bearing member layer (42) being the arranged lengthwise to a movement direction of the toothed belt.

* * * * *